(12) United States Patent
Kosh et al.

(10) Patent No.: US 7,111,491 B2
(45) Date of Patent: Sep. 26, 2006

(54) PORTABLE DIFFERENTIAL PRESSURE GENERATOR

(75) Inventors: William Stephen Kosh, Shelton, CT (US); Mehdi Golafshani, Woodbury, CT (US)

(73) Assignee: Ashcroft Inc., Stratford, CT (US)

( * ) Notice: Subject to any disclaimer, the term of this patent is extended or adjusted under 35 U.S.C. 154(b) by 0 days.

(21) Appl. No.: 11/065,173

(22) Filed: Feb. 24, 2005

(65) Prior Publication Data

US 2005/0229672 A1    Oct. 20, 2005

Related U.S. Application Data

(60) Continuation of application No. 10/791,932, filed on Mar. 3, 2004, and a continuation-in-part of application No. 10/736,010, filed on Dec. 15, 2003, now Pat. No. 6,895,799, which is a division of application No. 10/151,053, filed on May 16, 2002, now Pat. No. 6,672,130.

(60) Provisional application No. 60/317,805, filed on Sep. 8, 2001.

(51) Int. Cl.
  *G01L 27/00* (2006.01)
(52) U.S. Cl. ..................................... 73/1.57
(58) Field of Classification Search ............. 73/1.57
  See application file for complete search history.

(56) References Cited

U.S. PATENT DOCUMENTS

| | | | |
|---|---|---|---|
| 3,508,431 A | 4/1970 | Richardson et al. | |
| 4,102,175 A | 7/1978 | Foster | |
| 4,380,166 A | 4/1983 | Crombie | |
| 4,406,161 A * | 9/1983 | Locke et al. | ............... 73/118.1 |
| 4,655,074 A | 4/1987 | Robertson et al. | |
| 4,658,829 A | 4/1987 | Wallace | |
| 4,776,201 A | 10/1988 | Jones | |
| 4,842,806 A * | 6/1989 | Ohtomi | ..................... 376/247 |
| 4,920,802 A | 5/1990 | McMullin et al. | |
| 5,016,466 A | 5/1991 | Ness et al. | |
| 5,129,264 A * | 7/1992 | Lorenc | .................... 73/861.42 |
| 5,269,659 A * | 12/1993 | Hampton et al. | ............. 417/12 |
| 5,295,790 A * | 3/1994 | Bossart et al. | ................. 417/43 |
| 5,328,851 A * | 7/1994 | Zaromb | ...................... 436/178 |
| 5,837,881 A | 11/1998 | Martin | |
| 5,861,561 A * | 1/1999 | Van Cleve et al. | ...... 73/861.52 |
| 5,970,801 A * | 10/1999 | Ciobanu et al. | ......... 73/861.52 |
| 6,069,326 A | 5/2000 | Henson et al. | |
| 6,352,001 B1 * | 3/2002 | Wickert et al. | .......... 73/861.52 |
| 6,865,957 B1 * | 3/2005 | Hughes et al. | ........... 73/861.52 |
| 2003/0046974 A1 | 3/2003 | Kosh | |
| 2004/0083820 A1 * | 5/2004 | Ciobanu et al. | ......... 73/861.52 |

FOREIGN PATENT DOCUMENTS

FR    2 582 400 A    11/1986

(Continued)

OTHER PUBLICATIONS

International Search Report dated Dec. 12, 2002 for PCT/US02/26498.

(Continued)

*Primary Examiner*—Robert Raevis
(74) *Attorney, Agent, or Firm*—Fish & Richardson P.C.

(57) ABSTRACT

A dual range dynamic pressure differential generator for use at low pressures using a differential over a variable valve for a first stage pressure differential and the differential over a flow accelerator for a second stage pressure differential. The differential over the variable valve is useful for higher pressure differentials while the differential created over the flow accelerator is useful for a lower range pressure differential, although the two ranges may overlap.

15 Claims, 6 Drawing Sheets

FOREIGN PATENT DOCUMENTS

JP 04309830 11/1992

OTHER PUBLICATIONS

J-C. Legras, "Etalonnage de Capteurs DP Sous Pression de O a 400 Bars," vol. 49, No. 9, Jun. 1, 1984, pp. 45-47, 49, 51, 52.

R. Devanathan, "An Automatic Aid for the Callibration of a Differential Pressure Transmitter," Proceedings from IECON '86, 1986 International Conference on Industrial Electronics, Control, and Instrumentation, vol. 1, Sep. 29, 1986, pp. 158-163.

PCT International Search Report, PCT/US2005/007142, Jul. 5, 2005, pp. 1-3.

* cited by examiner

PORTABLE DIFFERENTIAL PRESSURE GENERATOR

RELATED APPLICATIONS

This application is a continuation of U.S. patent application Ser. No. 10/791,932, filed on Mar. 3, 2004, and a continuation in part of U.S. patent application Ser. No. 10/736,010, filed on Dec. 15, 2003, now U.S. Pat. No. 6,895,799 which is a divisional of U.S. patent application Ser. No. 10/151,053, filed on May 16, 2002 and issued as U.S. Pat. No. 6,672,130 on Jan. 6, 2004, which claims priority to U.S. Provisional Application No. 60/317,805, filed on Sep. 8, 2001, the disclosures of all related applications and patents being incorporated herein by reference.

TECHNICAL FIELD

This invention relates to a device and method of calibration of pressure sensing equipment, and more particularly to dynamic pressure differential generation for handheld calibration of pressure measuring instruments.

BACKGROUND

To calibrate instruments, such as differential pressure transmitters in HVAC (Heating, Ventilation and Air Conditioning) Systems in-place, a NIST (National Institute of Standards and Technology) traceable handheld calibrator is typically used to provide an accurate reading of a pressure differential between two pressure lines. One method typically used to provide pressure to the pressure lines is with large units using a static pressure source. Typically, a static pressure is provided by compressing a closed volume of air a desired amount to obtain a higher pressure within a high pressure line. A low pressure line provides either ambient pressure or another reference pressure. A handheld calibrator is used to provide an accurate reading of the pressure differential between the two pressure lines. When a sensor in an instrument to be calibrated is exposed to the pressure differential, the readings from the instrument may be adjusted or verified to match the readings of the NIST traceable handheld module. In this way, the instrument sensor may be calibrated. A drawback associated with the use of a static pressure source is that, when measuring very small pressure differentials, e.g. 0.01" WC (approximately 1/270th of a psi), even slight temperature changes can affect the pressure within a closed volume. Minor leaks are also a problem with closed volume systems. Therefore, it is typically difficult to generate and maintain the constant pressures over time. The inability to maintain constant pressures over time causes difficulties in calibrating instruments that require field calibration and verification. Field calibration verification in Biotech/Pharmaceutical applications is mandated by agencies, such as the FDA (Food and Drug Administration). Due at least in part to the above mentioned difficulties, many users have a very difficult time with instrument calibration.

Another type of pressure source used for instrument calibration is a dynamic pressure generator. Dynamic pressure generators are large apparatuses, typically confined to table top use in a laboratory. Additionally, dynamic pressure generators are only effective over a certain range depending on the flow generating means used (i.e. pump, vacuum, or other means for creating dynamic flow) and the power source provided for the flow generating means.

SUMMARY

In one embodiment the present invention is a dual range dynamic pressure differential generator for use at low pressures using a differential over a variable valve for a first stage and a differential over a flow accelerator for the second stage pressure differential. The differential over the variable valve is useful for higher-pressure differentials while the differential created over the flow accelerator is useful for a lower range pressure differential, although the two ranges may overlap.

In first implementation of the invention, a portable pressure differential generating system includes a portable flow accelerator having a passage therethrough. The passage has a high pressure region with a first cross sectional area and a low pressure region with a second cross sectional area, the first cross sectional area being larger than the second cross sectional area. The accelerator further includes: an accelerator low pressure tap in fluid connection with the low pressure region of the flow accelerator wherein the low pressure tap is adapted for fluid connection with a low pressure port of a pressure measuring device; and an accelerator high pressure tap in fluid connection with the high pressure region of the flow accelerator wherein the high pressure tap is adapted for fluid connection with a high pressure port of a pressure measuring device. The system further includes a portable pump in fluid connection with the passage in the flow accelerator.

The ratio of the first cross sectional and the second cross sectional area of the flow accelerator may be from between 5:1 and 40:1. In a preferred embodiment the ratio of the first cross sectional and the second cross sectional area is between 8:1 and 22:1.

In some implementations the portable pressure differential generating system may include a low pressure line in fluid communication with the accelerator low pressure tap, the low pressure line being adapted for fluid connection with a low pressure port of a pressure measuring device; and a high pressure line in fluid communication with the accelerator high pressure tap, the high pressure being line adapted for fluid connection with a high pressure port of a pressure measuring device.

In some implementations the pump of the portable pressure differential generating system is configured to create a positive fluid flow away from the pump and force fluid through the passage of the flow accelerator. Alternatively, the pump of the pressure differential generating system may be a vacuum pump configured to draw fluid through the passage of the flow accelerator toward the pump.

The pressure differential generating system may additionally include a variable valve disposed between and in fluid communication with the flow accelerator and the pump. The valve has an upstream side and a downstream side defined by the direction of fluid flow through the valve. A valve low-pressure tap is in fluid connection with the downstream side of the valve; and a valve high-pressure tap is in fluid connection with the upstream side of the valve. A range selection device is included for selecting either a first pressure differential across the accelerator low-pressure tap and the accelerator high-pressure tap or a second pressure differential across the variable valve through the valve low-pressure tap and the valve high-pressure tap. The range section device is a valve that has a first state which provides fluid connection of the accelerator high pressure tap to a high pressure outlet and the accelerator low pressure tap to a low pressure outlet and a second state which provides fluid connection of the valve high pressure tap to a high pressure outlet and the valve low pressure tap to a low pressure outlet. The range selection device may alternatively have a first state, which provides fluid connection of the accelerator high-pressure tap to a low-pressure outlet, and a second state, which provides fluid connection of the valve high-pressure tap to a high pressure outlet.

In one embodiment, the direction of main fluid flow is away from the pump and the accelerator low-pressure tap and valve low-pressure tap may be a common tap. Alternatively, the direction of main fluid flow may be toward the pump and the accelerator low-pressure tap and the valve high-pressure tap may be a common tap.

The present invention may include a portable pressure calibration system. The portable calibration system includes a handheld measurement module having a pressure differential sensor with a high-pressure input and a low-pressure input. The system further includes a pressure differential generating module associated with the handheld measurement module. The pressure differential generating module has a portable flow accelerator having a passage therethrough as heretofore described.

The portable pressure calibration system may also include a valve disposed between and in fluid communication with the flow accelerator and the pump, the valve having an upstream side and a downstream side defined by the direction of fluid flow through the valve. A valve low-pressure tap is in fluid connection with the downstream side of the valve; and a valve high-pressure tap is in fluid connection with the upstream side of the valve. A range selection device is provided to alternately select the corresponding high-pressure and low-pressure taps across the valve or the accelerator. The present invention includes a method for creating a pressure differential over two ranges including the steps of initiating a flow through a variable valve and a flow accelerator in direct fluid communication therewith by activating a pump in direct fluid communication with the valve; controlling the rate of flow through the variable valve and the flow accelerator by adjusting the valve, the valve having an upstream side and a downstream side defined by the direction of fluid flow through the valve and the flow accelerator having a high pressure region with a first cross sectional area and a low pressure region with a second cross sectional area, the first cross sectional area being larger than the second cross sectional area; accessing the static pressure differential over the valve through a valve high pressure tap in fluid communication with the upstream side of the valve and a valve low pressure tap on the downstream side of the valve; accessing the static pressure differential over the flow accelerator through an accelerator low pressure tap in the low pressure region and an accelerator high pressure tap in the high pressure region; and selecting between the static pressure differential over the valve and the static pressure differential over the accelerator and providing that differential to the a low output port and a high output port.

The present invention further includes a method for calibrating a pressure measuring instrument having the steps of: dynamically generating a pressure differential with a handheld portable pressure calibration system; isolating the handheld portable pressure calibration system from communicating with a pressure sensor in the pressure measuring instrument; measuring the pressure differential with the handheld portable calibration system allowing the pressure calibration system to communicate with the sensor in the pressure measuring instrument; comparing a pressure reading from the pressure measuring instrument to a pressure reading from the handheld pressure calibration system; adjusting the pressure measuring instrument until the pressure reading from the instrument agrees with the pressure reading from the handheld pressure calibration system.

In one implementation, the method for calibrating a pressure measuring instrument may include the steps of connecting a high pressure line and a low pressure line to a pressure measuring instrument; isolating the high pressure line and the low pressure line from communicating with a pressure sensor in the pressure measuring instrument; dynamically generating a pressure differential with a handheld pressure calibration system connected to the high pressure line and the low pressure line; measuring the pressure differential with a handheld pressure calibration system; allowing the high pressure line and the low pressure line to communicate with the sensor in the pressure measuring instrument; comparing a pressure reading from the pressure measuring instrument to a pressure reading from the handheld portable pressure calibration system; and adjusting the pressure measurement instrument until the pressure reading from the instrument agrees with the pressure reading on the handheld portable pressure calibration system.

The method of calibration may further include selecting between a static pressure differential over at least one valve and a static pressure differential over a flow accelerator contained in the handheld portable pressure calibration system and providing that differential to a low output port and high output port of the handheld portable pressure calibration system.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
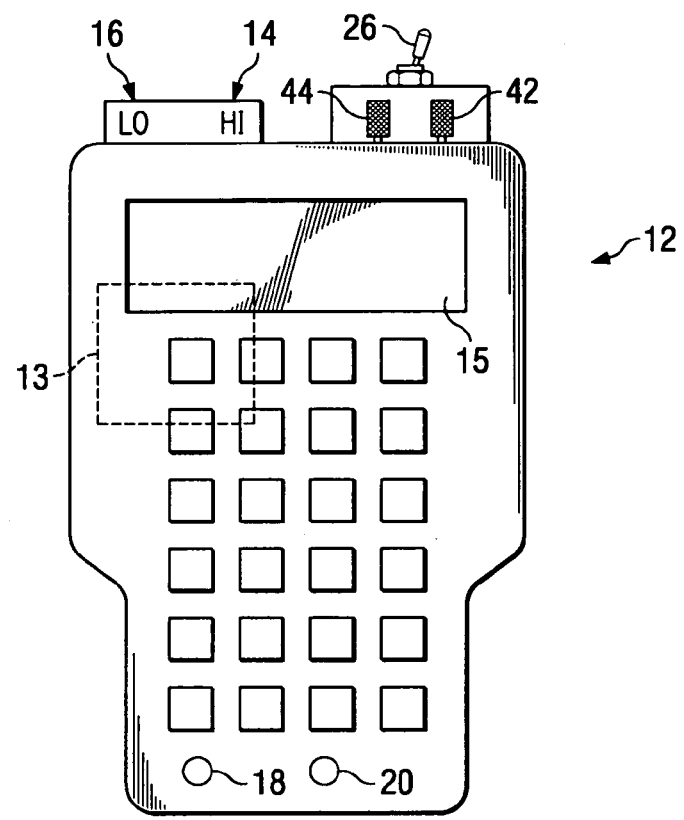
FIG. 1 is a top view of a handheld calibration module with the pressure source of the present invention inserted therein.
Figure 2:
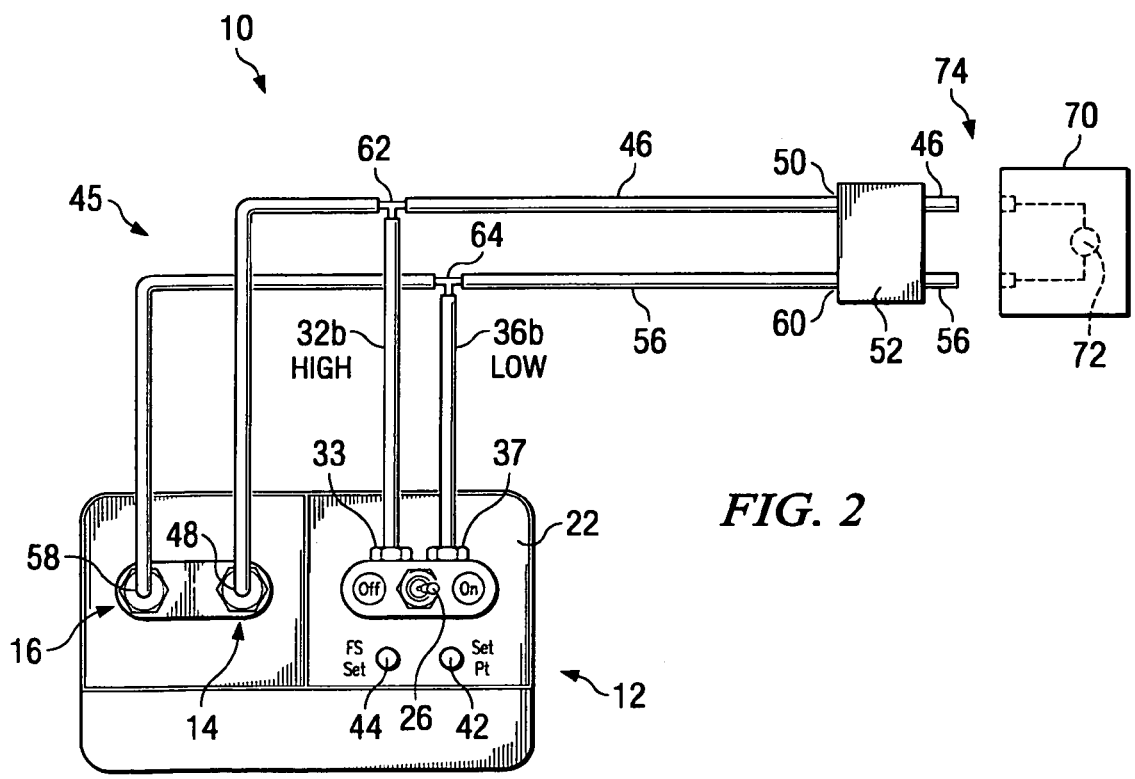
FIG. 2 is a front view of the handheld calibration module of FIG. 1 showing the pressure source of the present invention inserted therein.
Figure 3:
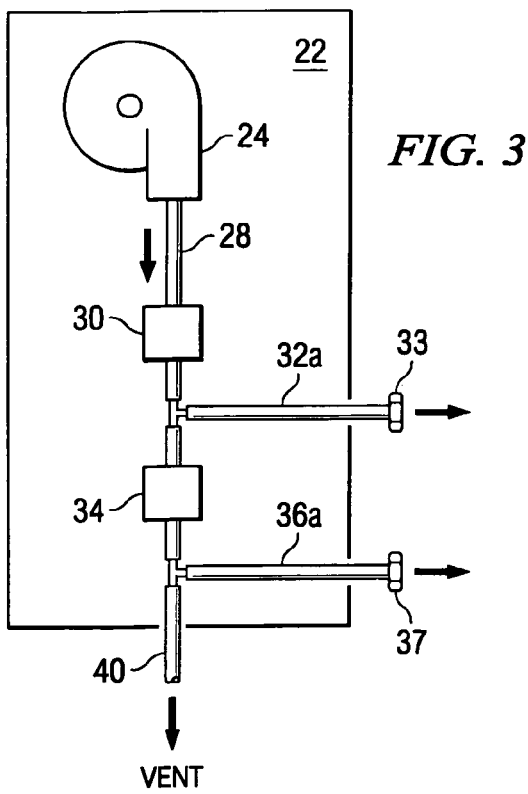
FIG. 3 is a schematic representation of the pressure source shown in FIG. 2.

Referring now to FIGS. 1–3, a pressure calibration system 10 utilizes a prior art handheld module 12. Handheld module 12 has a pressure sensor 13, which is usually calibrated to NIST (National Institute of Standards and Technology) standards, i.e. is NIST traceable. Handheld module 12 has a high pressure input 14 and a low pressure input 16. Handheld module 12 usually has an electrical input/output 18 and 20 (FIG. 1). The ability to measure electrical output through electrical input/outputs 18 and 20 allow the handheld module 12 to perform like an electrical multi-meter. Additionally, handheld module 12 is usually provided with a display screen 15, for displaying data to a user. One example of a handheld measurement instrument can be found in U.S. Pat. No. 6,069,326, which is incorporated by reference in its entirety herein.

A pressure source 22 (FIGS. 2 and 3) is, in the illustrated embodiment, configured as a plug-in module to be inserted into the handheld module 12. The pressure source 22 generates pressure that is used in conjunction with handheld device 12. The pressure source 22 generates a constant pressure which is dynamically controllable and which is used in conjunction with the handheld monitor 12 to create a traceable pressure signal.

Referring now to FIG. 3, the pressure source 22 has a miniature pump 24. An example of a miniature pump 24 is a 2D series pump available from GAST Mfg., Benton Harbor, Mich. 49023. Pump 24 may be powered by a battery located in the handheld module 12 or the pressure source 22 may be provided with a battery. Alternatively, the pressure source 22 may receive power from an external source. An on/off switch 26 (FIGS. 1 and 2) is provided for activating the miniature pump 24. An output line 28 (FIG. 3) is in communication with the miniature pump 24. A flow control valve 30 (FIG. 3) is provided on output line 28. An example of a flow control valve 30 is a F-2822 Series Needle Valve available from Air Logic, Racine, Wis. 53402. Flow control valve 30 sets the volume of flow based on the pressure of miniature pump 24.

A pressure source high pressure line 32a communicates with the output line 28 at a location downstream of flow control valve 30. The pressure source high pressure line 32a terminates at a pressure source high pressure output 33. A pressure generating element 34 is also located on the output line 28. The pressure generating element 34 is located downstream from the pressure source high pressure line 32a and may be a valve of the same type as flow control valve 30 described above. The pressure generating element 34 is used to create less resistance for a lower pressure drop or may be adjusted to create a greater resistance and therefore a greater pressure drop across the pressure generating element 34. A pressure source high-pressure line 32a is provided in communication with the output line 28. A pressure source high-pressure line 36a terminates at pressure source high-pressure output 33. The pressure source low-pressure line 36a communicates with the output line 28 at a location downstream of the pressure generating element 34 and terminates at 37. A vent 40, which may be provided at a terminal end of output line 28, vents flow from output line 28 at a location downstream of the intersection point of the pressure source low-pressure line 36a. A differential pressure is therefore produced in the two lines 32a, 36a, which are shown as horizontal tubes, before and after the pressure generating element 34, as a higher pressure in tube 32a relative to the pressure in line 36a.

The pressure generating element 34 could also be a fixed laminar flow element that creates a pressure differential. An example of such an element would be an arrangement of small tubular elements within a larger output line 28. The axis of the each of the smaller tubular elements would be parallel to the axis of output line 28. The small tubular elements may have any cross sectional shape, i.e. round, hexagonal, triangular, elliptical, etc. The advantage of having a laminar flow element as the pressure generating element 34 is to provide a more stable pressure differential over a broader range of pressures and pressure differentials. Using a fixed laminar flow element as pressure generating element 34 does limit some of the adjustability of the overall unit, but does simplify both construction and operation.

Alternatively, pressure generating element 34 may be an adjustable laminar flow element, thus providing the benefits (including those noted above) of more laminar flow without limiting the adjustability of the unit. This could be achieved by controlling the flow through each of the smaller tubes of a laminar flow element individually or by combining an adjustable valve with a fixed laminar flow element. Accordingly, the pressure source 22 comprises a portable differential pressure generating system or module.

As seen in FIGS. 1 and 2, a "Full Scale (FS) Set" knob 42 is provided for adjusting the flow control valve 30. A "Set Point Knob" 44 is provided for adjusting the pressure generating element 34, and consequently, the pressure available at pressure generator low pressure line output 37. In the majority of applications, when knob 42 is adjusted, knob 44 would be adjusted in an inversely proportional amount. Therefore, knob 42 may be connected with knob 44 to automatically perform this inversely proportionate adjustment. Such a connection could be simple gears, although a belt drive or similar system could be used. In the case of such connection, it may only be necessary for one of the knobs 42, 44 to protrude from the face of the unit.

The pressure calibration system 10 is used to calibrate an instrument 70, which has a pressure sensor 72 located therein. For purposes of example, the instrument 70 may be the pressure measurement apparatus described in prior filed, commonly owned U.S. patent application Ser. No. 09/546856, which is incorporated by reference in its entirety herein. Despite the specific reference to the pressure measurement instrument discussed above, it is to be understood that the pressure calibration system 10 of the invention may be used to calibrate other instruments.

Figure 4:
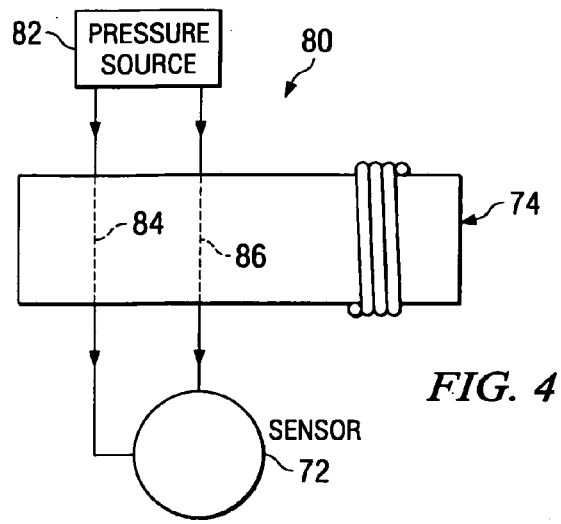
FIG. 4 is a schematic representation of a valve cylinder of an electronic pressure instrument in an operating mode position.
Figure 5:
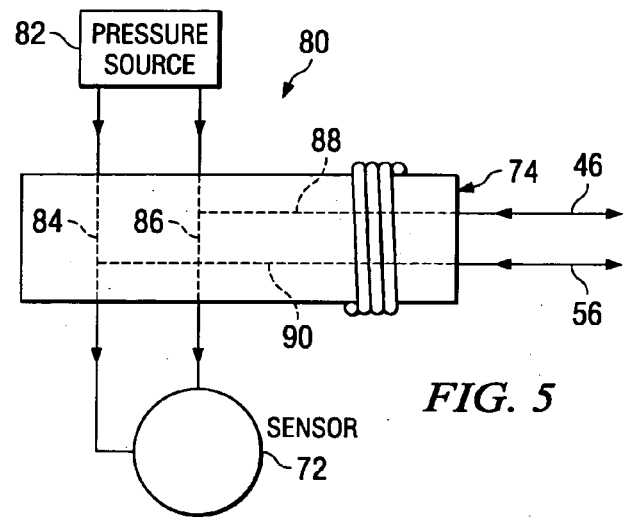
FIG. 5 is a schematic representation of a valve cylinder of an electronic pressure instrument in a monitoring mode position.
Figure 6:
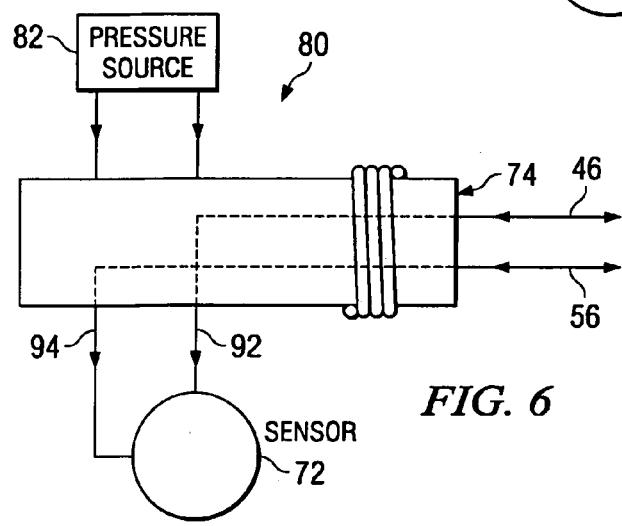
FIG. 6 is a schematic representation of a valve cylinder of an electronic pressure instrument in a calibrating mode position.

Instrument 70 has a valve port 74 (FIGS. 2, 4, 5 and 6) for receiving a probe 52. The instrument 70 should be capable of selectively exposing sensor 72 to the differential pressure between high pressure line 46 and a low pressure line 56 which are coupled to the probe 52. One example of how a pressure may be selectively exposed to a sensor 72 is shown in FIGS. 4, 5 and 6. Referring now to FIG. 4, a valve port 74 is shown on one end of a valve cylinder 80. A application pressure source 82 is shown in communication with sensor 72 via pathways 84 and 86.

Referring now to FIG. 5, valve cylinder 80 has been rotated such that pressure from high pressure line 46 and low pressure line 56 are communicated through valve port 74 with pressure source 82 and sensor 72 via lines 84, 86, 88 and 90.

Referring now to FIG. 6, the high pressure line 46 and low pressure line 56 interface with the valve port 74. The valve cylinder 80 has been adjusted to prevent pressure source 82 from communicating with sensor 72. Instead, high pressure line 46 communicates with sensor 72 via line 92. Low pressure line 56 communicates with sensor 72 via line 94.

Of course, other steps may be taken to selectively isolate the pressure source 82, the high and low pressure lines 46, 56, and the sensor 72. Examples include selectively opening and closing a plurality of valves or other means.

Referring now to FIG. 2, a calibration manifold 45 connects the probe 52 to the pressure generating module 22 and to the handheld module 12. The manifold 45 includes a high pressure line 46 which has a first end 48 that communicates with the high pressure input 14 of the handheld module 12. The high pressure line 46 has a second end 50 that communicates with a probe 52. A low pressure line 56 has a first end 58 that communicates with the low pressure input 16 of handheld module 12. The low pressure line 56 has a second end 60 that communicates with the probe 52. A high pressure T-joint 62 is provided in line with the high pressure line 46. The high pressure T-joint 62 joins the high pressure line 46 with a pressure generator high pressure line 32b that is in communication with the pressure generator high pressure output 33. A low pressure T-joint 64 is provided in line with the low pressure line 56. The low pressure T-joint 64 joins the low pressure line 56 with a pressure generator low pressure line 36b, which is in communication with the pressure generator low pressure output 37.

Figure 8:
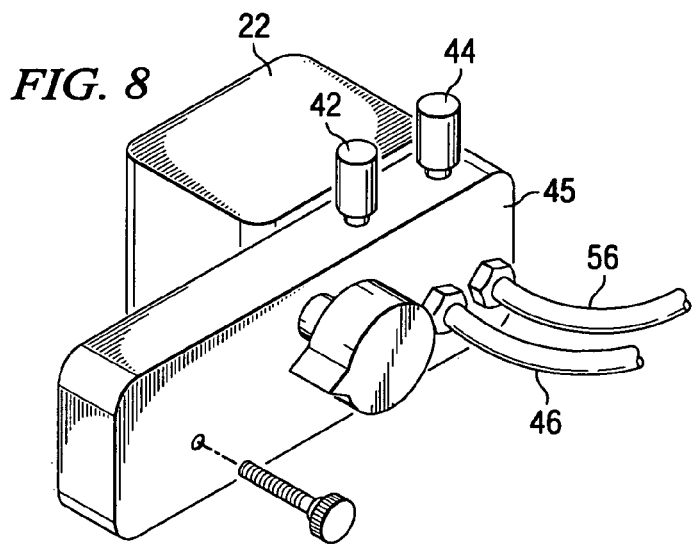
FIG. 8 is a perspective view of a pressure source with a solid calibration manifold.

Referring to FIG. 8, a molded or machined, plastic or metal, calibration manifold 45 may be used to replace the T-joints 62, 64 and parts of the pressure lines 46, 56, 32b, 36b to simplify operation of the pressure generating module 22 and interface with handheld module. For example, a calibration manifold 45 would contain passages that communicate with low pressure input 16 and high pressure input 14 as well as low pressure output 37 and high pressure output 33. The passages would functionally replace high pressure T-joint 62 and low pressure T-joint 64 and have ports for connecting to high pressure line 46 and low pressure line 56. FIG. 2 may be considered a schematic for the interior passages of such a molded or machined, plastic or metal, calibration manifold 45.

In practice, probe 52 is inserted into valve port 74 in the instrument 70. A valve cylinder 80 in instrument 70 or other means are used to isolate the pressure input of high pressure line 46 and low pressure line 56 from acting upon sensor 72 within instrument 70. The flow control valve 30 and the pressure generating element 34 are adjusted to achieve a desired pressure and a desired pressure differential between the pressure source high pressure line 32a, 32b and the pressure source low pressure line 36a, 36b. The calibrated pressure sensor 13 within handheld module 12 converts the pressure differential into electrical signals which are reflected by a numerical display on display screen 21 on handheld module 12. The valve cylinder 80 or other means is used to expose the instrument sensor 72 to the pressure differential between the high pressure line 46 and the low pressure line 56. The reading on sensor 72 is then made and compared with the reading from sensor 13 on the handheld module 12. The instrument sensor 72 may then be calibrated such that the readings of instrument sensor 72 are in agreement with the display 21 of handheld module 12.

Additionally, from the handheld module 12 an electrical calibration may be conducted via the electrical ports 18 and 20.

Figure 7:
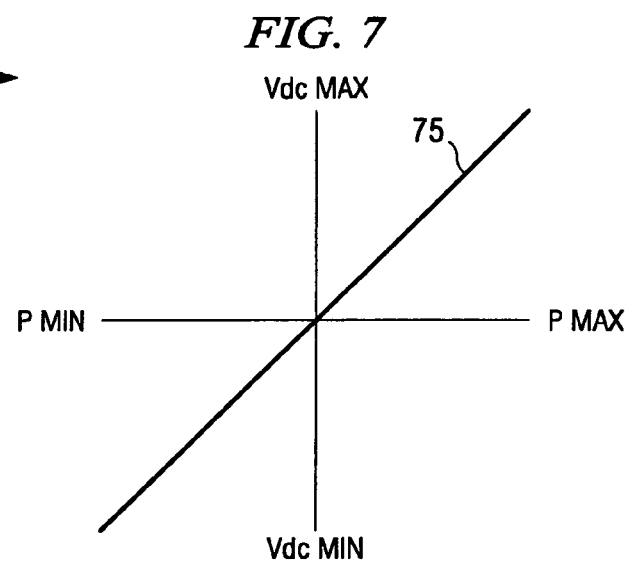
FIG. 7 is a graphical representation of pressure vs. voltage output.

In one embodiment the handheld module 12 allows an input of maximum pressure and minimum pressure based on the pressure generating module 22. Additionally, minimum electrical and maximum electrical input can be entered. A function is provided that may be labeled "Percent". By initiating this function the handheld module 12 calculates a scale and error of true output, which normalizes the sets of pressure input, in percent with electrical output, in percent. Therefore, this feature eliminates the need to have a cardinal pressure for calculating error. For example, by interpolation the handheld module may calculate a 2% error at a 98% full scale. The function nominalizes from zero to 100% as for an input variable that is interpolated. Therefore, a user can determine an error and correct for the error at any location on the full scale. Referring now to FIG. 7, as a further explanation, the x-axis indicates the pressure input from Pmin to Pmax. The y-axis indicates the electrical output of the DUT (device under test), e.g., instrument 70 from Vdc max to Vdc min. A straight line 75 having one end defined by Pmin and Vdc min and a second end defined by Pmax and Vdc max. The % function discussed above causes display screen 21 to display 0 to 100% based on the actual pressure input when compared to the range between the Pmin and Pmax values that have been selected. Therefore, at any time a user is able to discern what percent of the range from Pmin to Pmax is being detected. The display screen 21 may also depict the deviation from the line 75 is depicted as a percent of the range from Vdc min to Vdc max output. For example, if actual pressure is 0.90" WC on input values of 0 Pmin and 1.0" WC Pmax and the electrical output is 8.9 Vdc based on 0 Vdc min to 10 Vdc max, then the display indicates 90.0% on the pressure side and −1.0% on the output side as a deviation or error. Consequently, an operator need not know the pressure or the type of output. Instead, the operator may dial out the −1% error.

The procedure and device described above provides for a stable pressure differential in the single Pascal range; i.e. less than 10 Pa, as well as in the 10 Pa to 100 Pa range. This device and method is also stable for much higher pressure differentials, well into the kilo-Pascal (kPa) range. For reference, 10 Pa is equal to 0.04 inches of water or 0.075 mmHG (millimeters of mercury). Such low pressure differentials are necessary when attempting to calibrate highly sensitive pressure monitoring devices; but can be useful in other applications as well. The portability and stability of this device and the above method make for an ideal instrument for the calibration of pressure monitoring devices.

Figure 9:
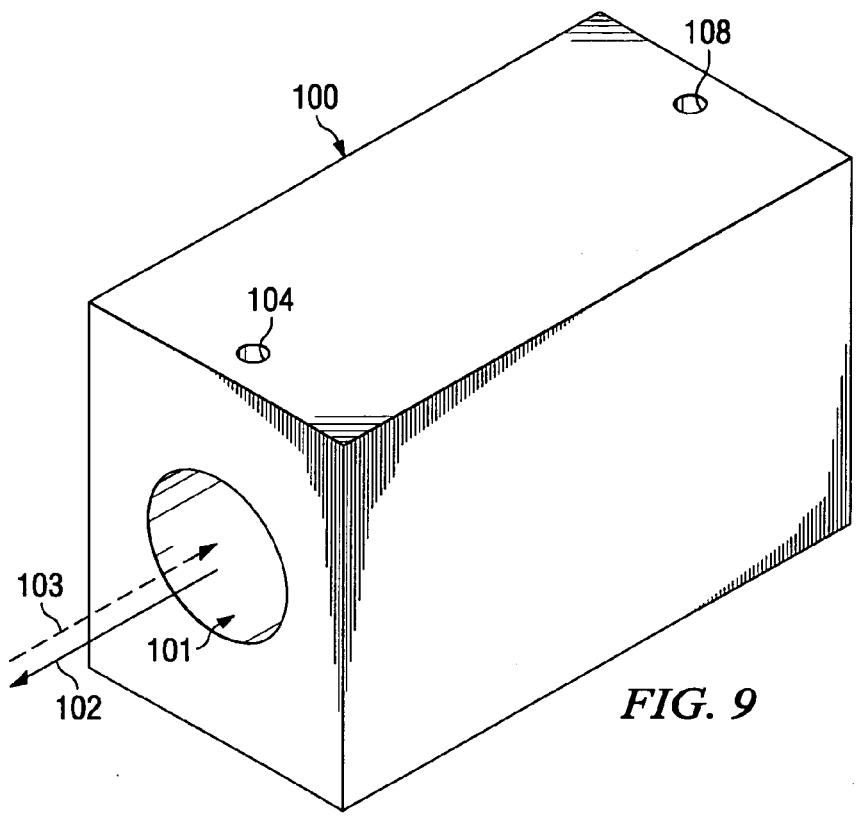
FIG. 9 is a perspective view of a flow accelerator.
Figure 10:
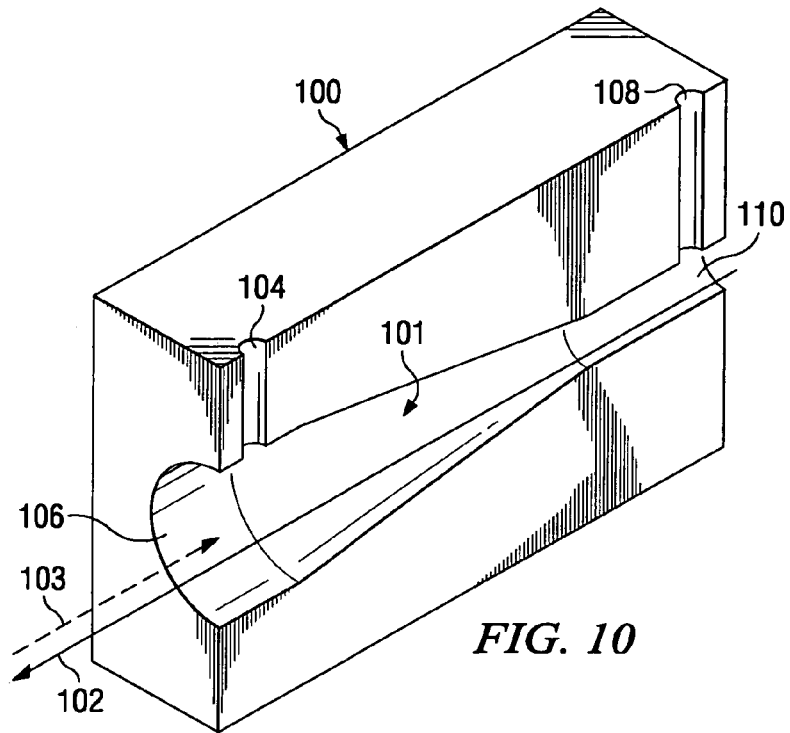
FIG. 10 is a sectional view of the flow accelerator of FIG. 9.
Figure 11:
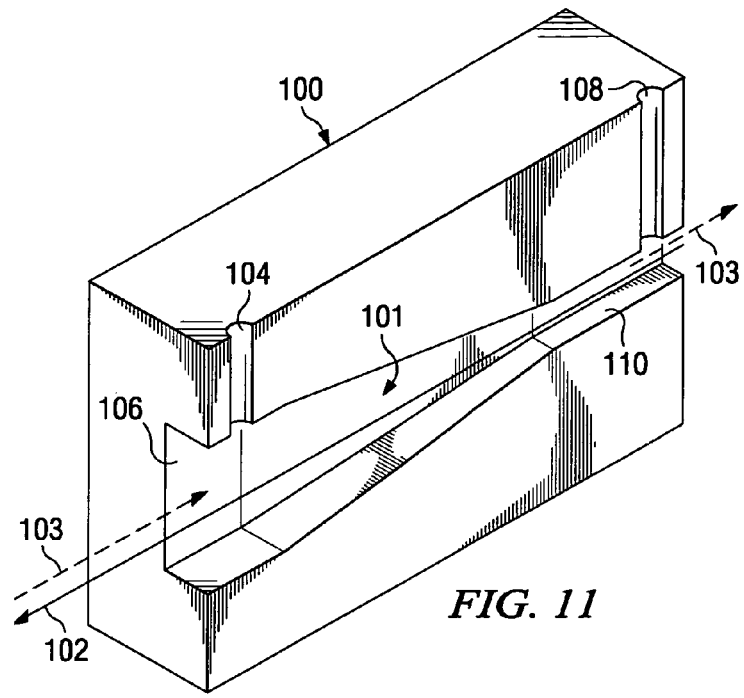
FIG. 11 is a sectional view of an alternate flow accelerator.

In another implementation of the portable differential pressure generator, FIGS. 9–11 illustrate a flow accelerator 100. The flow accelerator includes an internal passage 101 having a varying cross sectional area as shown in FIGS. 10 and 11. The cross sectional shape of the internal passageway may be circular, as shown in FIGS. 9 and 10, or square, as shown in FIG. 11, but is not limited to those shapes. Flow accelerator 100 has a high pressure region 106 and a low pressure region 110. The high pressure region 106 has a larger cross sectional area than the low pressure region 110. Flow accelerator 100 has a flow direction 102 shown to be from the low pressure region 110 towards the high pressure region 106. The flow 103 may be in the opposite direction when pump 124 (see FIGS. 12 and 13) is used as a vacuum pump. As shown, fluid (liquid or gas) will flow through the low pressure region 110 at a higher rate of speed than it will through the high pressure region 106. This will result in a lower static pressure in the low pressure region 110 and a higher static pressure in the high pressure region 106. To detect these static pressure values a low pressure tap 108 and a high pressure tap 104 are in fluid communication with the low pressure region 110 and the high pressure region 106, respectively. Taps of this sort may be about 10 to 30 one thousandths of an inch in interior diameter, but may be other sizes.

Figure 14:
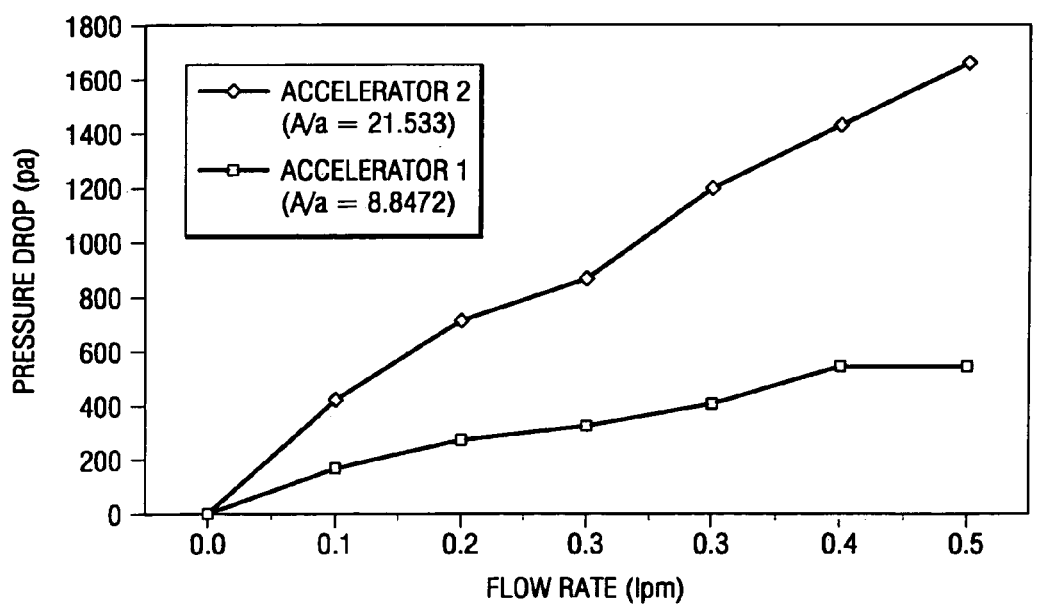
FIG. 14 is a graph showing test results for two flow accelerators.

In order to produce a low pressure differential the cross sectional area of the low pressure region 110 is smaller than the cross sectional area of the high pressure region 106. A first sample accelerator has a ratio of low pressure region cross sectional area to high pressure cross sectional area of about 8.8. In the first sample accelerator the area "A" is 0.0106 sq. inches and the area "a" is 0.0012 sq. inches. A second sample accelerator has a has a ratio of low pressure region cross sectional area to high pressure cross sectional area of about 21.5. In the second sample accelerator the A is 0.0106 sq. inches and the area is 0.000491 sq. inches. Test results involving these accelerators are shown in FIG. 14. As can be seen in FIG. 14, the effective range of a flow accelerator 100 will depend on the ratio of cross sectional area and the flow rate available. The flow accelerator 100 may be effective over a range from 1 Pa to 50 k Pa.

Figure 12:
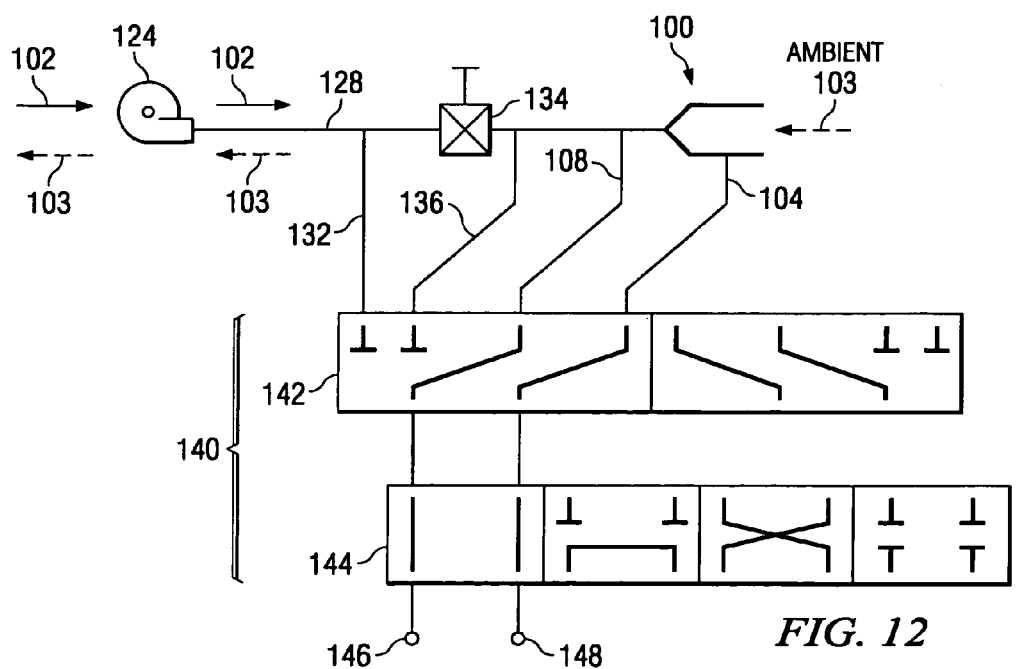
FIG. 12 is a schematic view of a dual range pressure source.

FIG. 12 is a schematic of a dual range pressure differential generator having a vacuum pump 124 with an output line 128 which leads to a differential pressure generating valve 134. In the configuration shown the pump output line 128 is attached to a first side of valve 134. Valve pressure tap 132 is in fluid connection with the first side of valve 134, while valve pressure tap 136 is in fluid connection with a second side of valve 134. Taps 132 and 136 are used to measure a pressure differential created by valve 134 as flow passes through the valve. The variable valve 134 may be adjusted to create a larger or smaller differential within a given range. Depending upon whether pump 124 is pulling a vacuum or outputting a positive pressure will determine the flow direction through pressure generating valve 134. Flow direction is illustrated in arrow 102 when the pump output is a positive pressure and flow direction arrow 103 when the pump is pulling a vacuum.

As shown in FIG. 12, a flow accelerator 100 is in fluid connection with valve 134. In the preferred embodiment pump 124 pulls a vacuum and therefore the flow direction is illustrated as arrow 103. Any pump is a noise source. In the preferred embodiment, with a vacuum pump with flow in direction 103, the noise is drawn away from the pressure taps and thereby the noise generated by pump 124 has minimal impact on measurements of pressure differentials taken from taps 104, 108, 132 and 136. One example of a vacuum pump suitable for use in the present invention is model VMP1624 available from Virtual Industries.

As illustrated in FIG. 12, accelerator pressure tap 104 and accelerator pressure tap 108 are shown in position to measure the pressure differential created through the flow accelerator 100. Pressure tap 136 and pressure tap 132 are shown in position to measure the pressure differential created across pressure generating valve 134.

A range selection apparatus 140 is used to select from the various pressure taps, 132, 136, 104, and 108, to direct a low pressure to low pressure output 146 and a high pressure to a high pressure output 148. In FIG. 12 the range selection apparatus is comprised of a range switch 142 and a port configuration switch 144, that are used in combination to connect the pressure taps 132, 108 to the low pressure output 146 and the pressure taps 136 and 104 to the high pressure output 148 depending on the range of pressure differential desired. The pressure generating valve 134 may be adjusted to provide a range of pressure differentials between the pressure tap 136 and the pressure tap 132. When a lower pressure differential is desired, the valve range selection apparatus 140 may be adjusted to provide a pressure differential between the accelerator high pressure tap 104 and the accelerator low pressure tap 108. In one implementation of the invention the flow accelerator 100 is used for generating a pressure differential on the lower part of a differential pressure range and the pressure generating valve 134 is used to create a variable pressure differential in an upper range as heretofore described in the specification.

Figure 13:
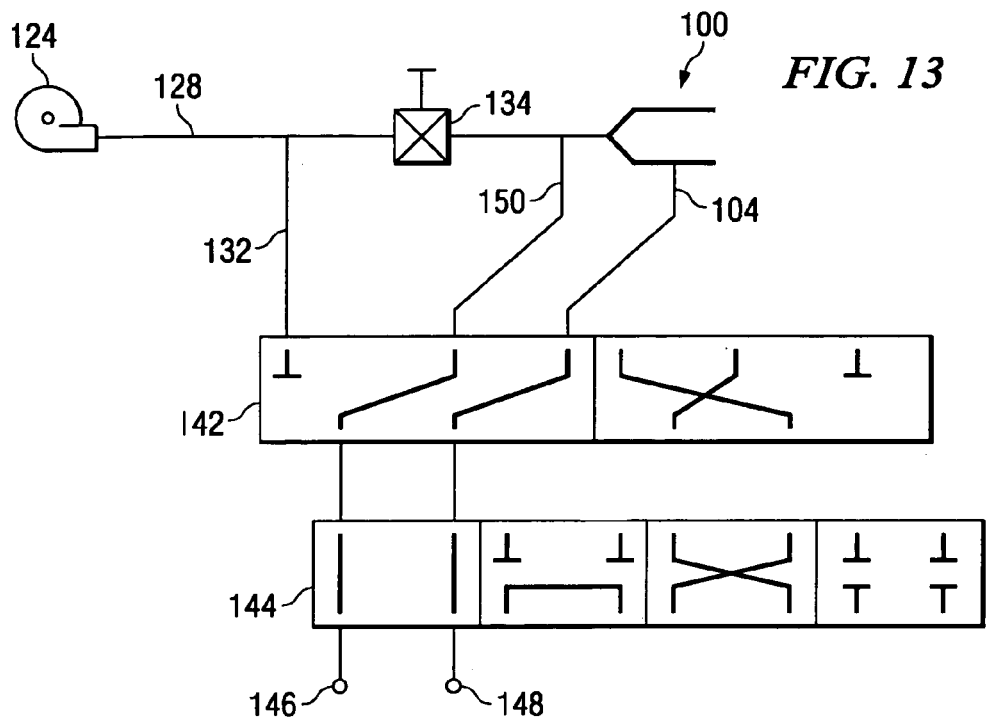
FIG. 13 is a schematic view of a dual range pressure source with a shared tap.

FIG. 13 shows another implementation of the system described above with the exception that the pressure tap 136 and the pressure tap 108, are replaced by common pressure tap 150. Because of the proximity between the valve 134 and the flow accelerator the second side of valve 134 is connected directly to the low pressure region of the flow accelerator 100 so that common pressure tap 150 is used to simplify the design and manufacture of the system.

As is common in flow systems, the direction of flow may be changed and still create similar properties. For instance, pump 124 may be configured to output a positive pressure through the system. This will reverse the roles of the taps on either side of the valve 134. The port configuration switch 144 and range switch 142 may be used to accommodate this use.

Output port 146 and output port 148 are analogous to output port 37 and output port 33 (see FIGS. 2 and 3) and may be used in exactly the same manner as described above.

The applicant's invention advantageously provides a compact, portable and NIST traceable pressure source for dynamically generating relatively low pressures down to single digit Pa. The pressure source is compact and capable of providing a very low and stable differential pressure by using a dynamic flow that compensates for temperature changes and volume changes. The compact module may be configured as a plug-in for existing handheld calibrators for operator ease. Existing handheld calibrators may be capable of calibrating electrical sensors as well as pressure sensors and other types of sensors. Therefore, it is advantageous to be able to locate all of the calibration functions on an easily transportable device. Other advantages may become apparent from the foregoing descriptions, as well as from the drawings and claims associated with the specification. Additionally, applicant's invention provides two ranges of pressure differential to be achieved in this handheld package using the same pump and power source. This increases the flexibility of the system and increases its usefulness.

A number of embodiments of the invention have been described. Nevertheless, it will be understood that various modifications may be made without departing from the spirit and scope of the invention. Accordingly, other embodiments are within the scope of the following claims.

What is claimed is:

1. A portable pressure differential generating system comprising:

a portable flow accelerator having a passage therethrough, said passage having a high pressure region with a first cross sectional area and a low pressure region with a second cross sectional area, the first cross sectional area being larger than the second cross sectional area, said accelerator further including:

an accelerator low pressure tap in fluid connection with the low pressure region of the flow accelerator, said low pressure tap adapted for fluid connection with a low pressure port of a pressure measuring device;

an accelerator high pressure tap in fluid connection with the high pressure region of the flow accelerator; said high pressure tap adapted for fluid connection with a high pressure port of a pressure measuring device;

a portable pump in fluid connection with the passage in the flow accelerator; and a valve disposed between and in fluid communication with the flow accelerator and the pump, the valve having an upstream side and a downstream side defined by the direction of fluid flow through the valve;

a valve low pressure tap in fluid connection with the downstream side of the valve; and a valve high pressure tap in fluid connection with the upstream side of the valve;

a range selection device for selecting either a first pressure differential across the accelerator low pressure tap and the accelerator high pressure tap or a second pressure differential across the valve through the valve low pressure tap and the valve high pressure tap.

2. The portable pressure differential generating system of claim 1 further including:

a low pressure line in fluid communication with the accelerator low pressure tap, said low pressure line adapted for fluid connection with a low pressure port of a pressure measuring device; and a high pressure line in fluid communication with the accelerator high pressure tap, said high pressure line adapted for fluid connection with a high pressure port of a pressure measuring device.

3. The portable pressure differential generating system of claim 1 wherein the pump is configured to create a positive fluid flow away from the pump and force fluid through the passage of the flow accelerator.

4. The pressure differential generating system of claim 1 wherein the pump is a vacuum pump configured to draw fluid through the passage of the flow accelerator toward the pump.

5. The system of claim 1 wherein the ratio of the first cross sectional and the second cross sectional area is between 5:1 and 40:1.

6. The system of claim 1 wherein the ratio of the first cross sectional and the second cross sectional area is between 8:1 and 22:1.

7. The system of claim 1 wherein the range section device is a valve that has a first state which provides fluid connection of the accelerator high pressure tap to a high pressure outlet and the accelerator low pressure tap to a low pressure outlet and a second state which provides fluid connection of the valve high pressure tap to a high pressure outlet and the valve low pressure tap to a low pressure outlet.

8. The system of claim 1 wherein a direction of main fluid flow is away from the pump and wherein the accelerator low pressure tap and valve low pressure tap is a common tap.

9. The system of claim 1 wherein a direction of main fluid flow is toward the pump and wherein accelerator low pressure tap and the valve high pressure tap is a common tap.

10. The system of claim 1 wherein the range selection device has a first state which provides fluid connection of the accelerator high pressure tap to a low pressure outlet and a second state which provides fluid connection of the valve high pressure tap to a high pressure outlet.

11. A portable pressure calibration system comprising:

a handheld measurement module having a pressure differential sensor with a high pressure input and a low pressure input;

a pressure differential generating module associated with said handheld measurement module, said pressure differential generating module comprising:

a portable flow accelerator having a passage therethrough, said passage having a high pressure region with a first cross sectional area and a low pressure region with a second cross sectional area, the first cross sectional area being larger than the second cross sectional area, said accelerator further including:

an accelerator low pressure tap in fluid connection with the low pressure region of the flow accelerator, said low pressure tap adapted for fluid connection with the low pressure input of the handheld measurement module;

an accelerator high pressure tap in fluid connection with the high pressure region of the flow accelerator; said high pressure tap adapted for fluid connection with the low pressure input of the handheld measurement module;

a portable pump in fluid connection with the passage in the flow accelerator;

a valve disposed between and in fluid communication with the flow accelerator and the pump, the valve having an upstream side and a downstream side defined by the direction of fluid flow through the valve;

a valve low pressure tap in fluid connection with the downstream side of the valve;

a valve high pressure tap in fluid connection with the upstream side of the valve; and a range selection device for selecting either a first pressure differential across the accelerator low pressure tap and the accelerator high pressure tap or a second pressure differential across the valve through the valve low pressure tap and the valve high pressure tap.

12. The portable pressure calibration system of claim 11 wherein the pump is configured to create a positive fluid flow away from the pump and forces fluid through the passage of the flow accelerator.

13. The portable pressure calibration system of claim 11 wherein the pump is a vacuum pump configured to draw fluid through the passage of the flow accelerator toward the pump.

14. The system of claim 11 wherein the range selection device is a valve that has a first state which provides fluid connection of the accelerator high pressure tap to a high pressure outlet and the accelerator low pressure tap to a low pressure outlet and a second state which provides fluid connection of the valve high pressure tap to a high pressure outlet and the valve low pressure tap to a low pressure outlet.

15. The system of claim 11 wherein the range selection device has a first state which provides fluid connection of the accelerator high pressure tap to a low pressure outlet and a second state which provides fluid connection of the valve high pressure tap to a high pressure outlet.

* * * * *